United States Patent
Ickinger et al.

(10) Patent No.: US 7,086,851 B2
(45) Date of Patent: Aug. 8, 2006

(54) INJECTION MOLDING MACHINE WITH AN ELECTROMOTIVE SPINDLE DRIVE AND A SPRING-BASED ENERGY STORAGE DEVICE FOR SUPPORTING THE ELECTRIC MOTOR

(75) Inventors: Georg Michael Ickinger, Graz (AT); Kittappa Gowda Harish, Chennai (IN); Mangalasseril Saju, Chennai (IN); Shanmuaham Sivakumar, Chennai (IN); Mathrubootmam Kumar, Chennai (IN); Anand Sukumaran Vivek, Chennau (IN)

(73) Assignees: Demag Ergotech GmbH & L & T-Demag Plastics Machinery, Schwaig (DE); Private Limited, Chennai (IN)

( * ) Notice: Subject to any disclaimer, the term of this patent is extended or adjusted under 35 U.S.C. 154(b) by 39 days.

(21) Appl. No.: 10/689,555

(22) Filed: Oct. 20, 2003

(65) Prior Publication Data

US 2004/0105910 A1    Jun. 3, 2004

Related U.S. Application Data

(63) Continuation of application No. PCT/EP02/04230, filed on Apr. 17, 2002.

(30) Foreign Application Priority Data

Apr. 19, 2001 (AT) ............................... A 632/2001

(51) Int. Cl.
  *B29C 45/40*     (2006.01)
(52) U.S. Cl. ................ 425/556; 425/574; 425/577
(58) Field of Classification Search ................ 425/574, 425/577, 542, 556
  See application file for complete search history.

(56) References Cited

U.S. PATENT DOCUMENTS

| 4,676,730 | A | * | 6/1987 | Yamasaki | 425/569 |
| 5,482,101 | A | * | 1/1996 | Fink | 164/312 |
| 5,499,916 | A | * | 3/1996 | Schad et al. | 425/564 |
| 5,804,224 | A | * | 9/1998 | Inaba et al. | 425/150 |
| 6,524,095 | B1 | * | 2/2003 | Ito et al. | 425/574 |
| 2002/0132026 | A1 | * | 9/2002 | Maurilio | 425/574 |

FOREIGN PATENT DOCUMENTS

| EP | 0 512 139 A1 | 11/1992 |
| FR | 2 739 428 | 4/1997 |
| JP | 61 068219 A | 4/1986 |
| JP | 03 231823 A | 10/1991 |
| JP | 07077210 A | 3/1995 |
| JP | 09 220739 A | 8/1997 |
| JP | 2000213616 A | 8/2000 |
| WO | WO 97/34757 | 9/1997 |

* cited by examiner

*Primary Examiner*—Duane Smith
*Assistant Examiner*—Emmanuel S. Luk
(74) *Attorney, Agent, or Firm*—Henry M. Feiereisen

(57) ABSTRACT

An injection molding machine includes an actuating drive in form of an electromotive spindle drive and an energy storage device associated with the spindle drive. The energy storage device stores kinetic energy and can include two counteracting compression spring assemblies. The energy storage device is hereby loaded, as the spindle drive moves to a first end position, and unloaded, as the spindle drive moves in opposite direction to a second end position, wherein unloading of the energy storage device is accompanied by a power boost of the electric motor, and wherein the first force is equal to the second force at an equilibrium location distal from the end positions of the spindle drive.

10 Claims, 1 Drawing Sheet

INJECTION MOLDING MACHINE WITH AN ELECTROMOTIVE SPINDLE DRIVE AND A SPRING-BASED ENERGY STORAGE DEVICE FOR SUPPORTING THE ELECTRIC MOTOR

CROSS-REFERENCES TO RELATED APPLICATIONS

This application is a continuation of prior filed copending PCT International application no. PCT/EP02/04230, filed Apr. 17, 2002, on which priority is claimed under 35 U.S.C. §120, the disclosure of which is hereby incorporated by reference.

This application claims the priority of Austrian Patent Application, Serial No. A 632/01, filed Apr. 19, 2001, pursuant to 35 U.S.C. 119(a)–(d), the disclosure of which is incorporated herein by reference.

BACKGROUND OF THE INVENTION

The present invention relates to an injection molding machine with at least one actuating drive in the form of a spindle drive and an energy storage device associated with the spindle drive, and more particularly to an injection molding machine which is able to generate large acceleration and deceleration forces at stroke inversion points while keeping the energy consumption of an electric drive motor low.

International patent publication WO 97/34757 discloses a spindle drive with an electric motor operating as an actuating drive for an injection molding machine, and an energy storage device in the form of a compression spring arrangement operating in parallel with the spindle drive which relieves the electric motor in a feed motion phase. The load on the compression spring arrangement is increased during the return stroke and produces during the spindle feed motion an amplified force which decreases continuously in conformance with a characteristic spring curve.

Conversely, actuating drives employed for cyclical actuation of an ejector with a relatively high operating frequency or drives used to move large masses back and forth, for example the linear drive for the plasticizing unit, have to generate large deceleration and acceleration forces at the respective stroke inversion points. Conventional actuating drives can generate these forces only with the help of powerful electric motors, resulting in a correspondingly high energy consumption.

It would therefore be desirable and advantageous to provide an improved spindle drive in an injection molding machine, which obviates prior art shortcomings and is able to specifically generate large acceleration and deceleration forces at the stroke inversion points while keeping the energy consumption of the electric motor low.

SUMMARY OF THE INVENTION

According to one aspect of the invention, an injection molding machine includes at least one actuating drive constructed in the form of a spindle drive having an electric motor; and a dual energy storage device operatively connected with the spindle drive and constructed to apply to the spindle drive a first force and to apply to the spindle drive an opposing second force, wherein the energy storage device is loaded, as the spindle drive moves to a first end position, and unloaded, as the spindle drive moves in opposite direction to a second end position, with unloading of the energy storage device accompanied by a boosting of power of the electric motor, wherein the first force is equal to the second force at an equilibrium location distal from the end positions of the spindle drive.

The energy storage device is designed to store kinetic energy of a moving mass. By combining the dual energy storage device with an electromotive drive, which is magnetically coupled with the mechanical drive elements of the spindle drive instead employing a mechanically constrained (geared) coupling, the spindle drive according to the invention operates like a freely oscillating mass which—at least theoretically—oscillates linearly between the stroke end positions without consuming energy. As a result, the electric motor is almost entirely relieved from mass-related inertial forces and—for example, in the preferred application of a pulsating ejector actuation—has to supply essentially only the impact energy for ejecting the injection molded part(s).

The dual energy storage device has a simple design and preferably includes two counteracting compression spring arrangements, with at least one of the compression spring arrangements implemented in the form of a disk spring assembly.

According to another feature of the invention, the spindle drive can be selectively stopped against the stored force in at least one end position, approximately at the return stroke position of the ejector or alternatively at both stroke inversion points of the plasticizing unit, without requiring the electric motor to supply the holding forces.

According to another feature of the present invention, a variable force coupling mechanism may be provided which operates in parallel with the dual energy storage device between one of the mechanical drive elements and a housing portion of the spindle drive. The force coupling mechanism may include an impulse-controlled releasable locking device. When employed in an actuating drive for a plasticizing unit, the locking device may be designed to automatically lock the end positions of the plasticizing unit. If the spindle drive is used for pulsating actuation of the ejector, the force equilibrium of the energy storage device can be located close to the center of the ejector oscillation, while the excitation frequency of the electric motor can be tuned to the characteristic frequency of the oscillation system that is comprised of the dual energy storage device and the moved mass.

The moved mass includes hereby the mass of the drive unit, the ejector plate and ejector rams which are provided to eject an injection molded article. The drive unit includes a rotor of the electric motor and a spindle nut which is rigidly connected with the rotor. Suitably, the spindle nut is operatively connected with the spindle rod via rolling balls.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
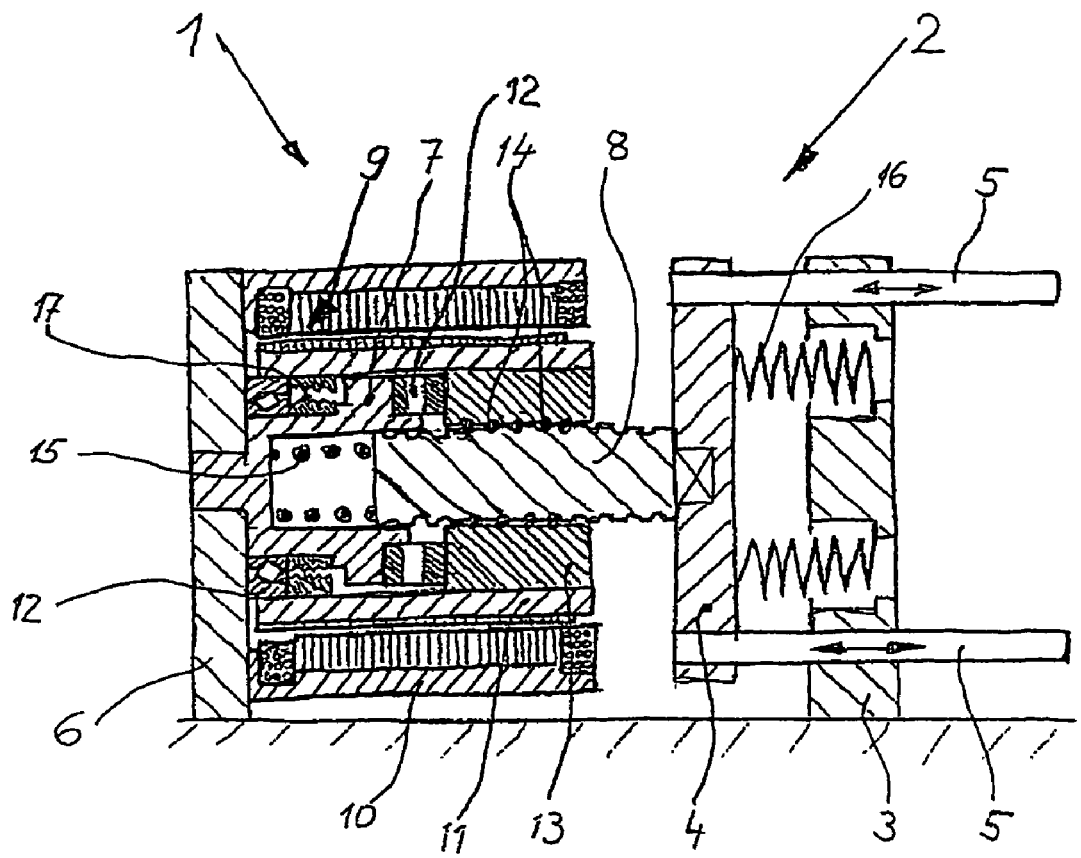
FIG. 1 shows schematically a longitudinal cross-sectional view of an injection molding machine in the region of the ejector with an associated actuating drive.

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned but have different inventive entity. Both applications are unique, but incorporate the other by reference. Accordingly, the following U.S. patent application Ser. No. 10/689,572 is hereby expressly incorporated by reference: "Plasticizing Unit with an Electromotive Spindle Drive for an Injection Molding Machine".

Turning now to FIG. 1, there is shown an actuating drive 1 for pulsating operation of an ejector 2 which includes a stationary guide plate 3 and an ejector plate 4 with ejector rams 5 which are secured to the ejector plate 4 and supported for linear movement on the guide plate 3.

The actuating drive 1 is implemented as an electromotive spindle drive and includes a stationary housing 6 with a central receiving unit 7 for the spindle rod 8 which is supported for linear displacement in the receiving unit 7. The front end of the spindle rod 8 is rigidly connected with the ejector plate 4, which prevents the spindle rod 8 from rotating. The actuating drive 1 further includes an electromotive drive 9 with an electrically excited stator 10 secured to the housing 6 and an associated rotor 11 which is rotatably supported in the receiving unit 7, but prevented from moving in the axial direction. A spindle nut 13 is rigidly connected with the rotor 11 of the drive 1 and is operatively connected with the spindle rod 8 via rolling balls.

A mechanical dual energy storage device is associated with the spindle drive 1 and includes a compression coil spring 15, which biases the spindle rod 8 in a feed direction, and disk spring assemblies 16, which counteract the compression coil spring 15 and are arranged between the guide plate 3 and the ejector plate 4.

The spindle drive 1 further includes an impulse-controlled releasable locking device 17, which is arranged between the rotor 11 and the receiving unit 7. The locking device 17 can be implemented in the form of a brake, a coupling, or a one-way lock, in order to lock the spindle rod 8 in the return stroke position against the restoring force of the compression spring 15 so as to prevent a stroke motion.

An injection molded article is ejected from the injection mold by releasing the locking device 17, causing the spindle rod 8 together with the ejector plate 4 and the ejector rams 5 to oscillate back and forth. The characteristic spring curves of springs 15, 16 are so dimensioned that the spring forces in the indicated center position of oscillation of the ejector plate 4 are approximately identical and operate in opposite directions. The electric motor 9 is excited in conformance with the characteristic frequency of the spring-mass system so as to cover the energy losses arising from the impact impulses required for ejecting the injection molded part from the mold and the inevitable friction losses of the oscillation system. After the injection molded article is ejected from the mold, the drive 1 is again locked in the return stroke position by the locking device 17.

Optionally, the spindle drive 1 can likewise also be used for controlling the stroke of the plasticizing unit (not shown) of an injection molding machine. To prevent further stroke motion, the plasticizing unit can be locked by locking device 17 at the two stroke inversion points, i.e., in the feed position during the injection process and/or in the return position of the plasticizing unit until the end of the filling process. In this case, the counteracting spring arrangements 15, 16 have to be designed with a correspondingly greater stiffness due to the significantly greater mass of the plasticizing unit.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An injection molding machine, comprising:
   at least one actuating drive constructed in the form of a spindle drive having an electric motor, said spindle drive moving between a first end position and a second end position and having an equilibrium position distal from the end positions; and
   a dual energy storage device operatively connected with the spindle drive and receiving energy from the spindle drive in the first end position and transferring energy to the spindle drive in the second end position, said transferred energy boosting power of the electric motor, wherein the dual energy storage device includes a first compression spring arrangement and a second compression spring arrangement, which acts in opposition to the compression spring of the first compression spring arrangement.

2. The injection molding machine of claim 1, wherein at least one the compression spring arrangements is implemented as a disk spring assembly.

3. An injection molding machine, comprising:
   at least one actuating drive constructed in the form of a spindle drive having an electric motor, said spindle drive moving between first end position and a second end position and having an equilibrium position distal from the end positions; and
   a dual energy storage device operatively connected with the spindle drive and receiving energy from the spindle drive in the first end position and transferring energy to the spindle drive in the second end position, said transferred energy boosting power of the electric motor, wherein the electric motor has a rotor and the spindle drive has a spindle nut connected to the rotor and a housing having a housing portion for support of the electric motor, and further comprising a variable force coupling mechanism operating in parallel with the dual energy storage device and disposed between one member of the group selected of the rotor and the spindle nut, and the housing portion.

4. The injection molding machine of claim 3, wherein the force coupling mechanism includes an impulse-controlled releasable locking device for the member.

5. The injection molding machine of claim 4, wherein the spindle drive is constructed for controlling a stroke of a plasticizing unit, wherein the locking device is constructed to automatically lock, when the plasticizing unit reaches end positions.

6. An injection molding machine, comprising:
   at least one actuating drive constructed in the form of a spindle drive having an electric motor, said spindle drive moving between a first end position and a second end position and having an equilibrium position distal from the end positions;

a dual energy storage device operatively connected with the spindle drive and receiving energy from the spindle drive in the first end position and transferring energy to the spindle drive in the second end position, said transferred energy boosting power of the electric motor, and an ejector for ejecting an injection-molded article, wherein the spindle drive is constructed for pulsating actuation of the ejector, and wherein the equilibrium location is approximately at a center point of oscillation of the ejector.

7. The injection molding machine of claim 6, wherein the spindle drive is constructed for selective locking of a retracted position of the ejector.

8. The injection molding machine of claim 6, wherein the dual energy storage device and a moved mass of the actuating device form an oscillating system having a characteristic frequency, and wherein the electric motor has an excitation frequency which is tuned to the characteristic frequency.

9. The injection molding machine of claim 8, wherein the ejector includes an ejector plate and ejector rams, which are connected to the ejector plate for ejecting an injection-molded article, and wherein the spindle drive includes a spindle rod, which is connected to the ejector plate, and a spindle nut which is connected to a rotor of the electric motor, said moved mass including the ejector plate, ejector rams, spindle rod and spindle nut.

10. The injection molding machine of claim 9, wherein the spindle nut is operatively connected with the spindle rod via rolling balls.

* * * * *

UNITED STATES PATENT AND TRADEMARK OFFICE
CERTIFICATE OF CORRECTION

PATENT NO. : 7,086,851 B2  Page 1 of 1
APPLICATION NO. : 10/689555
DATED : May 30, 2006
INVENTOR(S) : Georg Michael Ickinger et al.

It is certified that error appears in the above-identified patent and that said Letters Patent is hereby corrected as shown below:

Title Page

Item [73] Assignees: following "Demag Ergotech GmbH" add --Schwaig (DE)--
followed by --L&T-Demag Plastics Machinery Private Limited, Chennai (IN)--

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,086,851 B2 | Page 1 of 1 |
| APPLICATION NO. | : 10/689555 | |
| DATED | : August 8, 2006 | |
| INVENTOR(S) | : Georg Michael Ickinger et al. | |

It is certified that error appears in the above-identified patent and that said Letters Patent is hereby corrected as shown below:

Title Page

Item [73] Assignees: following "Demag Ergotech GmbH" add --Schwaig (DE)-- followed by --L&T-Demag Plastics Machinery Private Limited, Chennai (IN)--

This certificate supersedes Certificate of Correction issued December 12, 2006.

Signed and Sealed this

Ninth Day of January, 2007

JON W. DUDAS
*Director of the United States Patent and Trademark Office*